J. A. MARTIN.
ELECTRIC LIGHTING DEVICE.
APPLICATION FILED MAY 11, 1914.
1,169,338.
Patented Jan. 25, 1916.
2 SHEETS—SHEET 1.
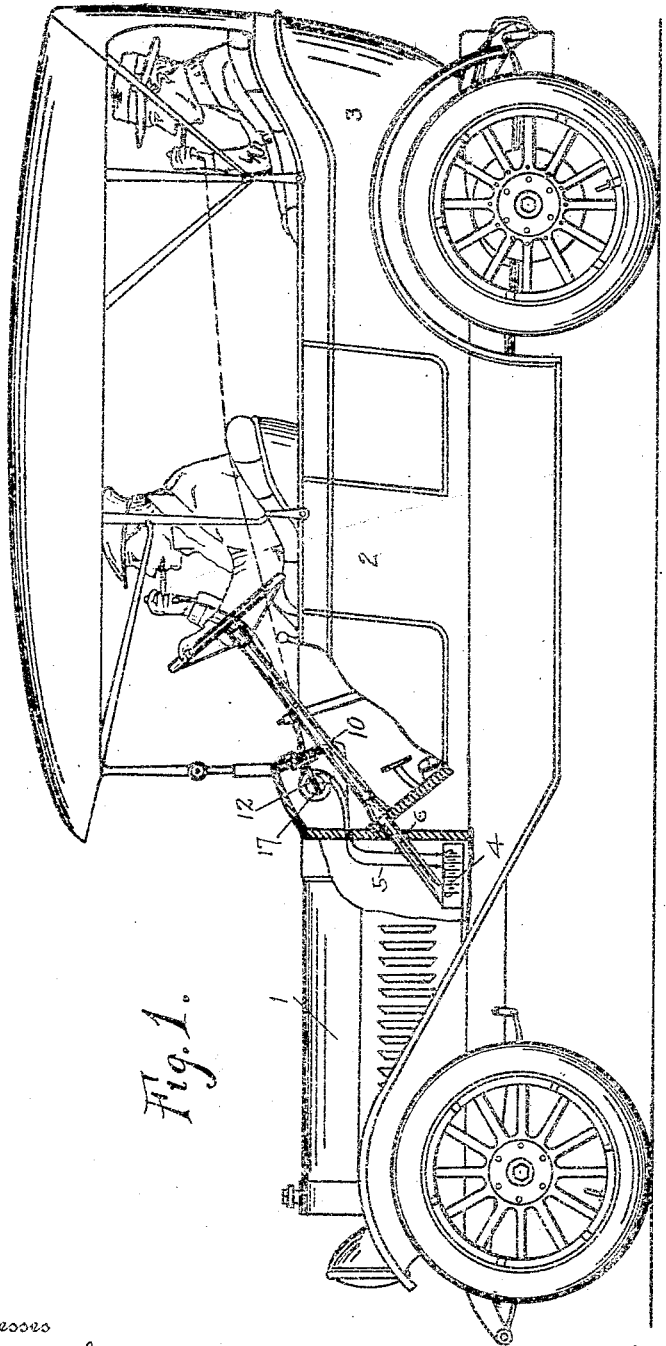
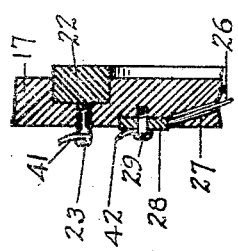
Inventor
John A. Martin J. A. MARTIN.
ELECTRIC LIGHTING DEVICE.
APPLICATION FILED MAY 11, 1914.
1,169,338.
Patented Jan. 25, 1916.
2 SHEETS—SHEET 2.
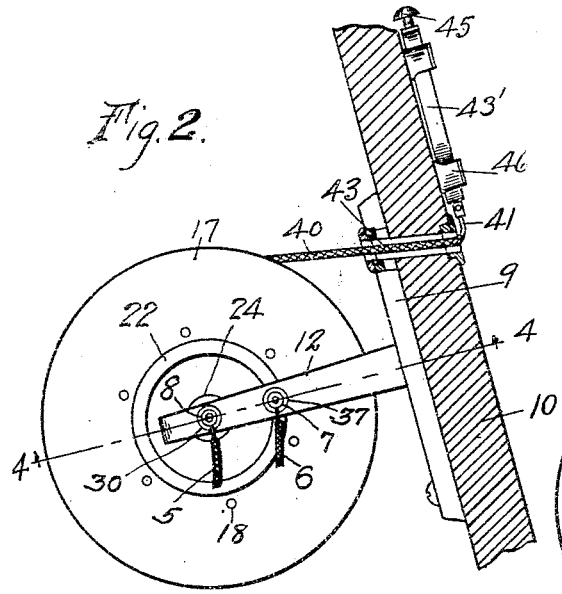
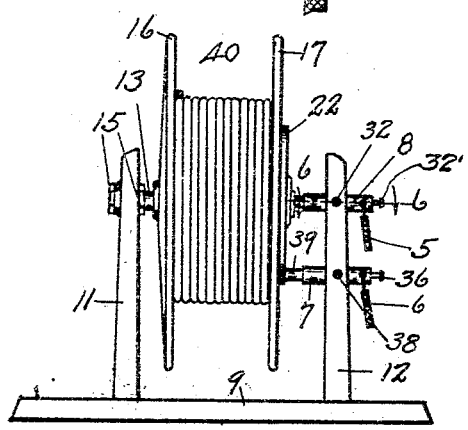
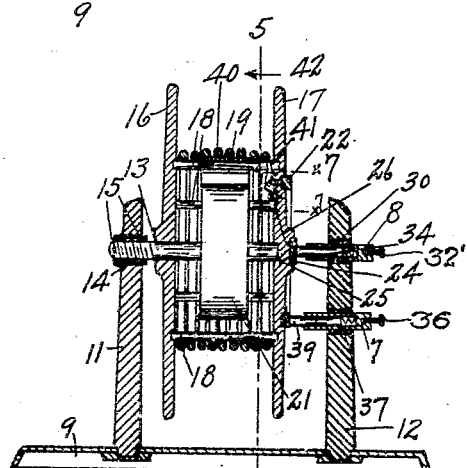
Inventor
John A. Martin
By Herbert E. Smith
Attorney
Witnesses
Harold Scantlebury
Ansley Strom

UNITED STATES PATENT OFFICE.

JOHN A. MARTIN, OF SPOKANE, WASHINGTON, ASSIGNOR OF ONE-HALF TO HARRY W. MARTIN, OF SPOKANE, WASHINGTON.

ELECTRIC LIGHTING DEVICE.

1,169,338.

Specification of Letters Patent.

Patented Jan. 25, 1916.

Application filed May 11, 1914. Serial No. 837,907.

*To all whom it may concern:*

Be it known that I, JOHN A. MARTIN, a citizen of the United States, residing at Spokane, in the county of Spokane and State of Washington, have invented certain new and useful Improvements in Electric Lighting Devices, of which the following is a specification.

The object of this invention is to provide an electric lighting or glowing device which is extensible with respect to its mounting so as to be withdrawn therefrom for limited distances so as to be utilized either as a cigar lighter, for illuminating purposes or for other utilities for which such electric device may be desired.

It is a further object of the invention to embody in the device a flexible conduit or cable on the free end of which a cigar lighter, electric lamp or other circuit closing electric device is disposed, the remaining end of the cable being mounted or connected with mechanism normally acting to withdraw or contract said cable into a relatively compact mass but serving to yield, on tension being imparted to the cable to permit the latter to be extended, said mechanism serving to connect the cable or the conductors that may be disposed therein with a source of current, in all positions or adjustments to which the cable may be subjected.

One of the particularly advantageous uses to which the device of my invention may be put is on automobiles for cigar lighting purposes where the free end of the cable may be extended from the point of mount of the device, which may be on the dash, to the front or even to the rear seat or seats.

Further objects and novel features will be more fully described in connection with the accompanying drawings and will be more particularly pointed out in and by the appended claim.

In the drawings: Figure 1, illustrates the application of the device of my invention to an automobile, as a cigar lighter. Fig. 2, is a vertical sectional view taken through a portion of the dash board, on an enlarged scale, showing one manner of mounting the invention. Fig. 3, is a view in side elevation of one portion of the invention which is shown in the form of a reel with a mounting therefor. Fig. 4, is a sectional view on line 4—4 of Fig. 2. Fig. 5, is a sectional view on line 5—5 of Fig. 4. Fig. 6, is a detail sectional view on line 6—6 of Fig. 3. Fig. 7 is an enlarged view on line $x^7-x^7$ of Fig. 4. Fig. 8, is a view in elevation of a form of lighting device, such as a cigar lighter, which may be applied to the device of my invention.

Like characters of reference designate similar parts throughout the different figures of the drawings.

I will first describe the device of my invention as employed in connection with a cigar lighter, as illustrated in the accompanying drawings, and when I hereinafter employ the term cigar lighter, it will be understood that such term is used as including any form of device, such as an incandescent lamp for instance, which functions as a device for closing circuit to utilize the resulting current either to light a darkened place or to light a cigar or otherwise act as a lighting device.

In the form shown, 1 designates the hood of an automobile and 2 and 3 the front and rear seats thereof. Within the hood and in front of the dash, I may dispose a source of current 4, of any suitable type. Conductors 5 and 6 lead from the source of current to binding posts 7 and 8, respectively, both of which are of the same construction which is shown more clearly in Fig. 6.

Before proceeding with a detail description of the binding posts, I will first describe my improved reel. A mounting is provided for the reel which may include a base 9 adapted for anchorage to a portion of the dash 10. The base 9 is provided with a journal post 11 and a supporting post 12. In the journal post I mount a spindle 13 which extends from the post 11 toward but not to the post 12. The spindle 13 may be insulated from the post 11 by a sleeve of insulating material 14, mounted in post 11 and disposed in said sleeve, the spindle being fixedly held in the place by nuts 15 adapted to be threaded onto the spindle 13 on opposite sides of the post 11. A reel is revolubly mounted upon the spindle 13 and may comprise reel disks or members 16 and 17 adapted to be connected with each other by means such as disk pins 18. To one of the pins 18 I connect one end 19 of a coil spring which is coiled about the spindle 13 and secured thereto at its remaining end 20. The spring, which may be designated 21, functions to rotate the reel in a winding direction, but permits of the reel being rotated in an unwinding direction.

I will next describe the manner in which the reel means may be connected up with the source of current. At least one of the reel disks, preferably disk 17, is formed of insulating material and is provided with an annular recess in which a metallic collector ring 22 is disposed and anchored in any desired manner. The ring 22 is concentrically disposed with respect to the axis of movement or rotation of the reel and is provided with a terminal 23 which extends through the disk 17 to the interior thereof, or rather the reel, and radially inwardly with respect to the concentrically disposed pins 18. An axially disposed collector, in the form of a disk 24, is seated in the outer face of disk 17, as shown in Fig. 4. The inner face of disk 17 is recessed at 25 to take the free end of spindle 13 so as to effectively mount the reel thereon. The axial collector 24 is connected by a conductor 26, which may extend through a bore 27, of the disk 17, to a terminal 28. The terminal 28 is held seated against the inside face of disk 17 by a terminal screw 29.

Binding post 8 is adjustably mounted in a sleeve 30, of insulating material, in the post 12 by means of an adjusting screw 32. As will be seen more clearly by reference to Fig. 6, binding post 8 is bored at 31 to receive conductor 5 and is provided with a binding screw 32' to firmly anchor conductor 5 therein. The remaining end of the binding post is socketed at 33 to receive a carbon brush 34, the free end of which contacts with axial collector 24. A spring 35 normally forces the brush outwardly and by adjusting the binding post 8 in the supporting post 12, any desired tension of the spring 35 can be effected. The spring 35 not only functions to maintain the brush 34 in firm electrical contact with collector 24 but it acts through the brush to normally hold the reel against displacement off from the spindle 13. The binding post 7 is precisely the same as binding post 8, having a binding screw 36 for anchoring conductor 6 and being mounted in an insulating sleeve 37 which may be adjustably anchored, together with the binding post, in the supporting post 12, by an adjusting screw 38. The binding post 7 is socketed to receive a brush 39 which is held in engagement with ring 22 by a spring similar to spring 35. A conduit or cable 40 is wound upon the reel and may be provided with conductors 41 and 42 adapted for connection with terminal 23 and terminal 29, at one end of the cable. A sufficient length of cable is provided for any desired extent of extensibility of the device and the free end of the cable 40 may be extended through the dash board 10 at 43.

I have shown the conductors 41 and 42 connected with a circuit closing device in the form of a known type of cigar lighter, indicated as a whole at 43'. The cigar lighter 43' is provided with an opening through which a substance such as asbestos and wire 44 is accessible and against which the end of a cigar may be engaged for the purpose of lighting the latter. The cigar lighter 43 is provided with a switch adapted to be actuated by a button 45 to close circuit and cause 44 to glow. A spider-like holder 46 is shown mounted upon the dash board to detachably anchor the cigar lighter when the same is not in use, as indicated in Fig. 2.

It will be clear from the foregoing, that if an electric lamp were connected with the free end of the cable it would be useful to enable the operator to examine parts of the machine in darkness or in dimly lighted places and that an incandescent lamp, with its key would likewise function as a device for closing circuit through the conductors to utilize the resulting current.

Now it will be seen that the reel is always connected with the source of current and that the free end of the cable with the cigar lighter or other lighting device may be extended from the position of mount or dash board rearwardly to the front seat, and if desired, to the rear seat, the spring functioning to wind up the cable as tension on the latter is released.

It will be seen from the foregoing that I have provided an extensible device which I will for convenience term a conducting cable, together with mechanism connecting the cable to a source of current and normally acting to contract the cable into a relatively compact mass but adapted to yield upon pull on the cable to permit extension thereof, said cable having on its free end a useful form of circuit closing device.

While I have herein shown and described one specific form of my invention, I do not wish to be limited thereto except for such limitations as the claim may import.

I claim:—

In an extensible electric cable reel device, journal and supporting posts disposed in spaced relation, a spindle carried by said journal post and extending toward but not into engagement with said supporting post, a cable reel revolubly mounted on said spindle in spaced relation with respect to said supporting post and having a shoulder abutment engaging said spindle to limit shifting movement of said reel longitudinally on said spindle toward said journal post, a cable for said reel, collectors mounted on that outside face of said reel nearest said supporting post and having connections for attachment to said cable, and spring actuated brush devices carried by said supporting post and engaging said collectors to complete circuit therewith and hold said reel in shoulder abutting engagement with said spindle, substantially as described.

In testimony whereof I affix my signature in presence of two witnesses.

JOHN A. MARTIN.

Witnesses:
  HAROLD SCANTLEBURY,
  EDNA BROYLES.